INVENTOR.
Arthur Laudel, Jr.
BY
ATTORNEY.

May 15, 1962  A. LAUDEL, JR  3,035,181
ELECTRICAL SIGNALING SYSTEM
Filed Sept. 28, 1959  8 Sheets-Sheet 3

INVENTOR.
Arthur Laudel, Jr.
BY
ATTORNEY.

May 15, 1962 A. LAUDEL, JR 3,035,181
ELECTRICAL SIGNALING SYSTEM
Filed Sept. 28, 1959 8 Sheets-Sheet 4

INVENTOR.
Arthur Laudel, Jr.
BY
ATTORNEY.

May 15, 1962                A. LAUDEL, JR                3,035,181
ELECTRICAL SIGNALING SYSTEM
Filed Sept. 28. 1959

INVENTOR.
Arthur Laudel, Jr.
BY
Thos. E. Scofield
ATTORNEY.

May 15, 1962

A. LAUDEL, JR 3,035,181

ELECTRICAL SIGNALING SYSTEM

Filed Sept. 28, 1959

INVENTOR.
Arthur Laudel, Jr.
BY
Thos. E. Sasfield
ATTORNEY.

United States Patent Office 3,035,181
Patented May 15, 1962

3,035,181
ELECTRICAL SIGNALING SYSTEM
Arthur Laudel, Jr., Leawood, Kans., assignor, by mesne assignments, to the United States of America as represented by the Office of Civil Defense
Filed Sept. 28, 1959, Ser. No. 843,003
20 Claims. (Cl. 307—87)

The present invention relates in general to electrical signaling for the purpose of actuating or otherwise influencing signal responsive devices located at a distance from the signal source. This application is a continuation-in-part of my copending application Serial No. 695,613, filed November 12, 1957, now Patent 2,906,897, dated September 29, 1959.

More particularly, the invention is concerned with the use of existing transmission lines and networks (e.g., those employed by public and private utilities for the distribution of electric power) for auxiliary signaling and/or control purposes. These purposes sometimes may be related to the principal function of the existing transmission system, as for example, where an electric utility company desires to control water heaters or other selected electrical loads at the consumer's premises; or where the company desires to utilize its own lines for controlling the operation of switching apparatus at remote unattended substations. On the other hand, the auxiliary signaling sometimes may be desired for purposes not related, or only indirectly related, to the principal function of the existing network, as is true, for example, when the electric power supply lines are to be employed for receiving fire alarm signals at a central point from outlying locations, or are to be used to transmit air raid or other disaster warnings outwardly from a central location, or to perform telemetering operations from point to point, or to simultaneously operate teletype apparatus at a number of geographically spaced points.

Broadly speaking, it is the object of my invention to provide, as an adjunct to an existing transmission system or network (or to transmission lines which are used for other purposes) a signaling system capable of carrying out any or all of the aforementioned functions, as well as others of kindred or analogous nature.

In this connection, it is my further purpose to provide an auxiliary signaling system which when employed with a commercial power supply network is completely compatible with the design and operational characteristics of the latter, however complex it may be, and which in no way impairs or interferes with the normal operation of the power system or any of the apparatus connected thereto.

Another object is to provide a signaling system whose reliability, flexibility and usefulness are immeasurably enhanced by the simultaneous transmission of signals differing in character but not in kind, the kind of signal being compatible with the transmission media and suited for long-distance transmission, and the respective signals being so related in character as to permit easy differentiation between them when needed or, alternatively, use of them to complement one another where that may be desirable.

A further aim of my invention is to provide a signaling system having a novel means for originating signals, whereby the system affords great reliability as to signal transmission and reception, as well as rejection of false or spurious signals and the like; among the advantages of my novel signal originating means are extreme simplicity, long life and great stability with little or no maintenance, ease of installation, comparatively low initial cost, negligible cost of operation, and numerous other advantages that will become apparent hereinafter.

The idea of signaling over the lines and feeders of a power supply network is, of course, far from new. Carrier current systems, for example, are well known. In most cases they, like other signal injection systems, ordinarily rely upon a motor-generator set or frequency changer as the source of signal, this commonly being introduced into the power lines through a filter network. By way of contrast, my system employs no rotary equipment, nor, indeed, any moving equipment at all, save only, in some instances, a switch which may be employed to effect the changeover from nonsignaling to signaling condition.

Other than the carrier current or signal injection systems just mentioned, most arrangements heretofore proposed (a few of which have enjoyed limited use for special purposes in this country or abroad) have fallen generally into three classes: voltage dip or rise systems, voltage outage systems, and subharmonic systems. Out of necessity, some of these are combined with quite elaborate coding arrangements to prevent false alarms, and all of them have one or more additional shortcomings (high initial cost, complicated mechanism, high upkeep, lack of reliability, injurious effect upon the power station or consumer's equipment or impairment of the operation thereof, etc.).

All of these shortcomings are avoided in the present invention, largely due to what is believed to be a fundamentally new approach to the problem of signaling over commercial power supply lines. Unlike signal injection systems, I do not in reality inject any new current or power at all into the power line at the point where the signal is originated, and hence it will be obvious that no injection filter arrangements are necessary. Properly speaking, I take advantage of the voltage on the power line and modify this in a manner which yields the desired signal. In a sense this is what is done in various voltage dip systems that have been imposed in the past; but whereas voltage dip systems may result in brief reductions in the line voltage to a value as low as 20 percent of normal (even to zero in voltage outage systems), my arrangement avoids severe reductions, and I have found from actual tests thereof, as well as from power network analyzer studies, that line voltage ordinarily can be maintained at close to 99 percent of its normal value during signaling with my apparatus.

According to my invention, signaling may be said to be accomplished by utilizing a proportion of the alternating current voltage of the power line and converting this into certain useful harmonics of the fundamental power line voltage, these serving to modify the existing power current to a slight degree and being receivable by conventional apparatus of the tuned frequency or frequency discriminating type.

As previously indicated, the creation of these harmonics can be effected without motion, the signal source being passive in character. This source employs what I have chosen to call a harmonic signal inductor. The essential component is an inductive reactor which is connected to the power line and which has, with respect to the excitation received from the power line, an asymmetric hysteresis characteristic that is either inherent in the physical design of the reactor or is incorporated therein electrically by subjoined biasing elements that likewise are passive in nature.

With my harmonic signal inductor I am able, without serious effect upon the power line voltage, to produce the second, third, fourth, fifth and sixth harmonics of that voltage in magnitudes sufficient for signaling purposes. By proper design it is possible to accentuate the magnitude of certain harmonics at the expense of others, and for practical purposes I find it often desirable to do this. For signaling over the lines and feeders of the typical power supply network, for example, I prefer to use the second and/or fourth harmonics of the fundamental power line voltage wave, but it will be understood that for other forms of transmission lines and other situations one or more of the other harmonics may serve equally well or better. As a matter of fact, even for power network usage there are instances when the fifth harmonic can be employed to advantage; but this is not always the case, whereas the second and fourth harmonics have been found always to give consistently good results. Only rarely will the third and sixth harmonics serve the purpose, inasmuch as these are suppressed by every delta-Y transformer encountered en route from the signal source to the receiver. (Power companies have preferred to install transformers delta-Y or, where this is impossible, to use transformers having delta-tertiary windings for the very purpose of suppressing the third harmonic, inasmuch as this is produced by the generators and distribution transformers themselves under normal conditions.)

A number of the features and advantages of my signaling system and the apparatus employed therein will be evident from the foregoing, but there are many others, some of which will be self-evident and others perhaps less apparent on their face. To mention a few:

(1) My arrangement can be employed on any power line or network, whether it be 60 cycle, the accepted standard frequency for power transmission in this country or whether it be the 50 cycle European standard frequency. (It will be convenient in this specification to use 60 cycles when referring to the frequency of the power current but this, of course, is not intended to be limiting.)

(2) My harmonic signal inductor can be switched over from nonsignaling to signaling condition and vice versa, by a variety of alternative switching arrangements. The switches present no significant maintenance problem, and in most cases small conservatively rated, inexpensive switches can be employed. In some cases, the inductor is not connected to the line at all during the nonsignaling interval, so draws no current; in other cases, although connected to the line while in idle standby condition it draws only a very small excitation current, which can be done on a continuous basis without harm.

(3) The signal produced by my harmonic signal inductor can be coded in any desired fashion by operation of the switch just mentioned. Coding may sometimes be desirable in order to obtain selective operation of receivers, or the like; however, elaborate coding of signals is not necessary in order to prevent false operations, as is often true in other systems. The signals produced by my harmonic signal inductor are, in other words, readily receivable by inexpensive receiving equipment which does not need to rely upon coding in order to safeguard against false operation.

(4) My harmonic signal inductor can be installed without interruption of service to the consumers who receive power from the supply network.

(5) The harmonic signal inductor can be installed at any place in the power supply or distribution network regardless of the system voltage at the point of insertion.

(6) The harmonic signal inductor requires less space than a carrier type installation of comparable capacity, and all of the equipment can be weatherproof in design for outdoor installation.

(7) My harmonic signal inductors can, if desired, be installed at a plurality of widely separated points in a power distribution system; and when so installed they can be made to operate in parallel merely by setting them up with similar excitation polarities throughout the system, whereby signal cancellation or interference from separate sources is eliminated or reduced to a harmless level.

(8) Exceedingly little power in required by my signaling system either for signaling purposes or in the course of stand-by operation. Where it is employed for widespread distribution of a general signal intended for the public at large, cost studies show that production of a one-second signal in an area containing approximately 350,000 homes would be in the neighborhood of two cents.

(9) With my harmonic signal inductor, it is possible to produce in the power line a signal which is adequate despite changes in the power load on the line. To reduce variations in signal strength, auxiliary means can be employed to obtain manual or automatic regulation of the level of the induced signal voltage in accordance with the overall load on the system, or on any particular portion thereof.

(10) The character of signal produced by my harmonic signal inductor is such that power factor capacitors in the regular power supply network do not require blocking filters. As previously indicated, injection filters likewise are not necessary. This is important not only because it represents a substantial saving in cost but also because such filters ordinarily attenuate the signal approximately 50 percent at the point of origin. By avoiding this initial signal loss my arrangement achieves considerably greater efficiency than possible in injection signal systems.

(11) Transmission of the auxiliary signal produced by my harmonic signal inductor has no tendency to cause power system instability. There need be no interruption of the conventional electric power service in the course of transmitting the signal nor does transmission thereof have any ill effect upon lamps, television receivers, appliances and other conventional equipment connected to power lines.

Other objects and features of my invention will appear in the course of the following description. In the drawings which form a part of the specification and are to be read in conjunction therewith, and in which like reference numerals refer to like parts in the various views:

FIG. 1 is a simplified one-line circuit diagram of the pertinent portion of an actual three-phase power distribution network in which extensive tests of my novel harmonic signal inductor have been made;

FIGS. 2–5, inclusive, are circuit diagrams showing different types of harmonic signal inductors embodying my invention, those in FIGS. 2 and 3 being arranged for use with a two-conductor single phase power distribution line, while those in FIGS. 3 and 4 are arranged for use with three-conductor single phase power distribution lines;

FIGS. 6–17, inclusive, are circuit diagrams illustrating alternative forms which my harmonic signal inductor may take when its purpose is to induce signals in three-phase power distribution lines;

Figure 2:
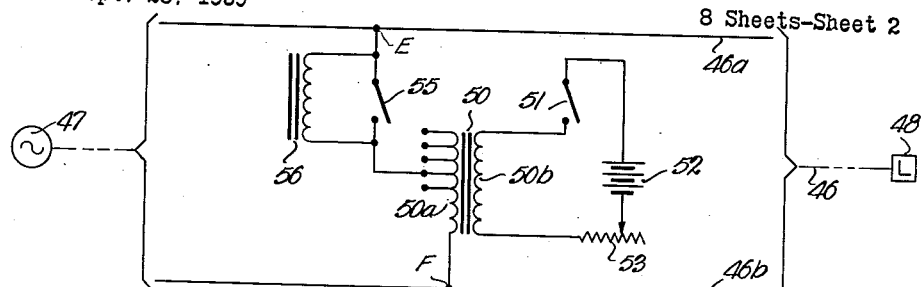
Figure 4:
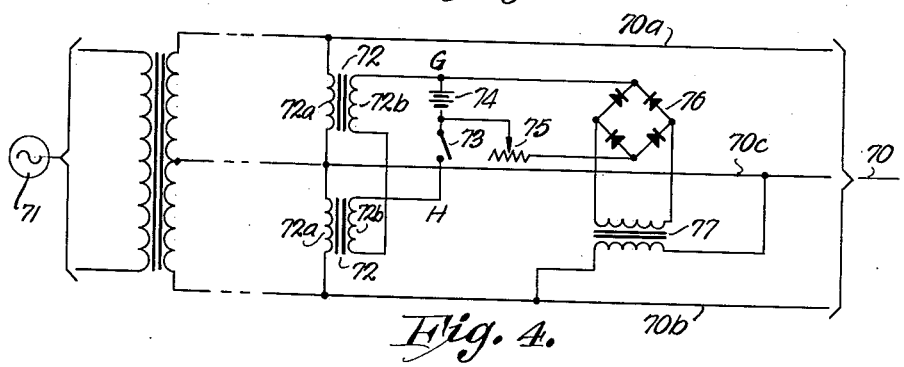
Figure 6:
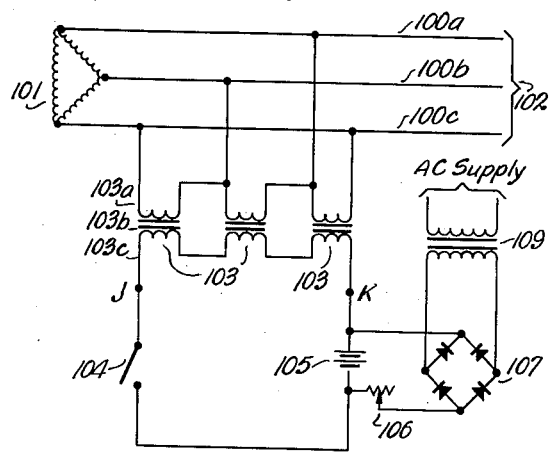
Figure 21:
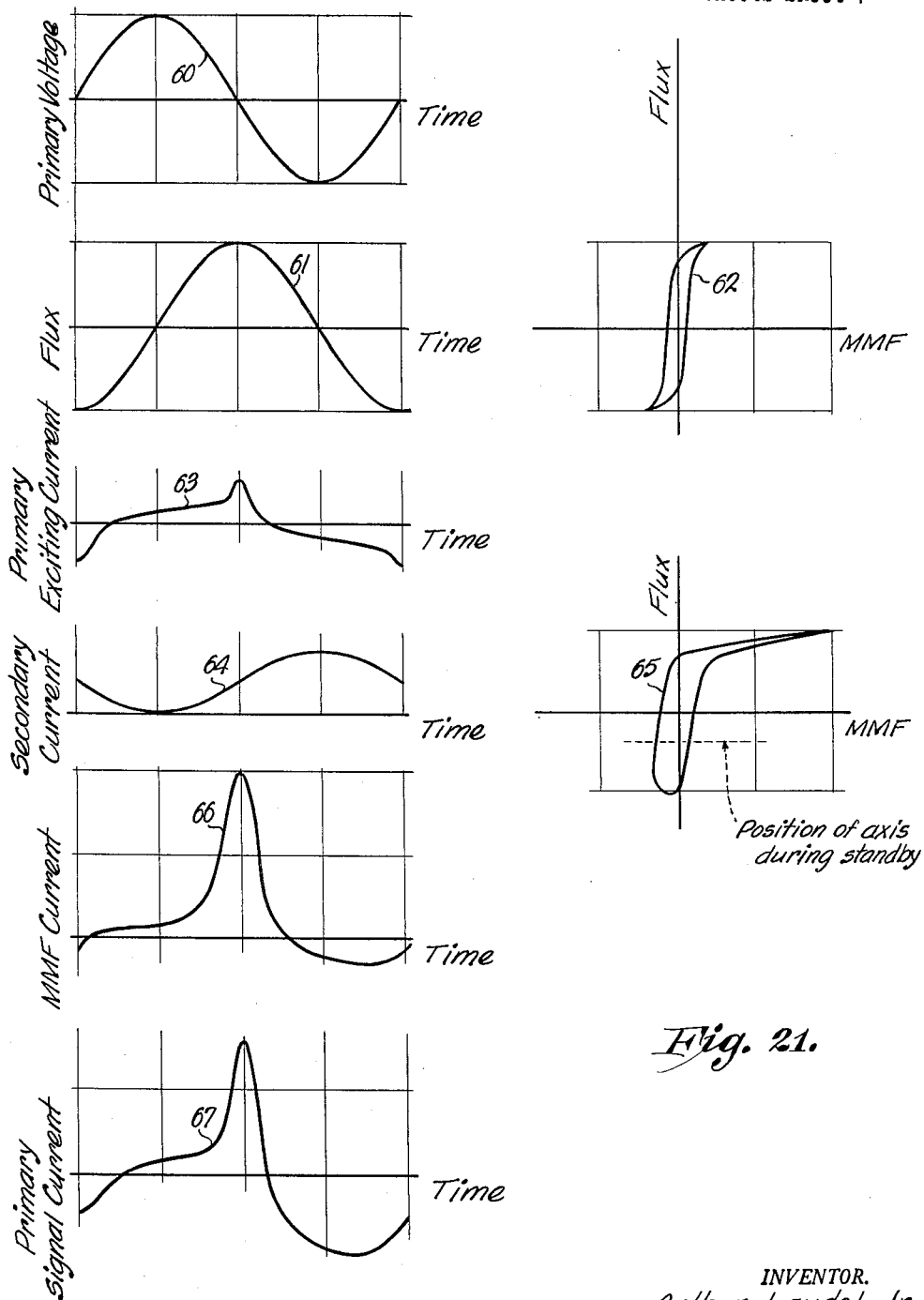
Figure 23:
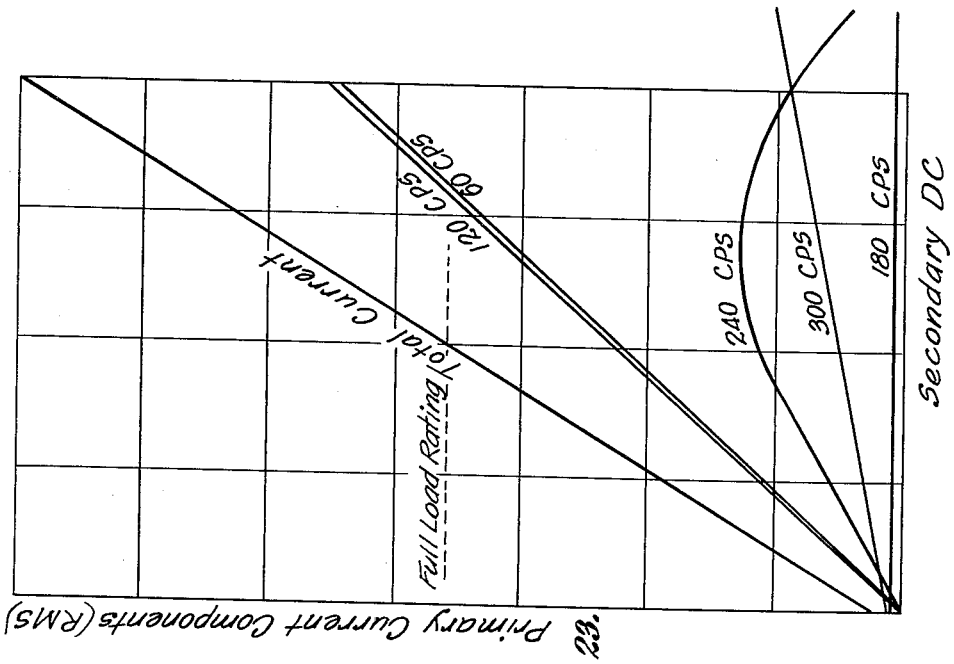
Figure 22:
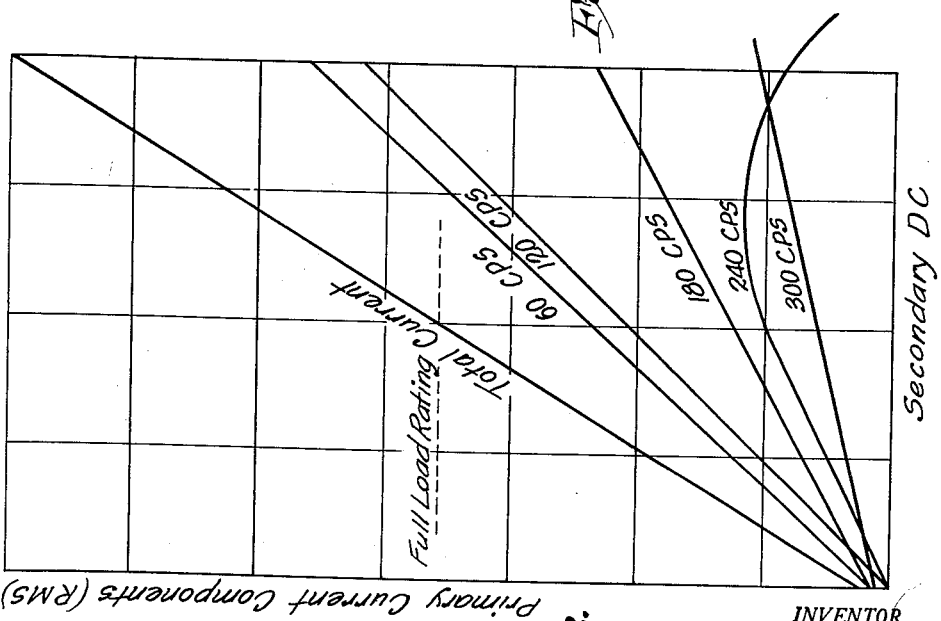

FIG. 21 is a set of curves graphically illustrating various relationships that exist in the harmonic signal inductor of FIG. 2 when the same is in signaling condition and also when the inductor is in stand-by or nonsignaling condition; and FIGS. 22 and 23 are graphs comprising a family of curves which reflect changes that occur in the harmonic content of the current produced in the primary winding of the signal inductors shown in FIGS. 4 and 6 under different conditions of D.C. excitation of the secondary windings.

Although other uses of my novel signaling arrangement will be readily apparent to those versed in the art, its primary field of intended application is for signaling over the lines and feeders of power distribution networks. In this connection it is particularly applicable to the transmission of signals for the purpose of alerting the public at large in times of national or area-wide emergency and/or for alerting key individuals (firemen, policemen, etc.) who need to be signaled on the basis of occupational classification without abitrary restriction as to their geographical location.

Before proceeding with the description of the arrangement and operation of my apparatus, note should perhaps be made of the fact that there are a number of considerations which make electric power distribution networks preferable over telephone networks or radio broadcasting for the transmission of warning signals to the public at large, or to selected cross sections of the public.

One major advantage resides in the fact that 99 percent of the people in critical defense areas have electric power service, while for the country as a whole the figure is 95 percent. Telephone lines reach a much smaller portion of the population. Moreover telephone central station equipment is inadequately powered to ring all phones in the community at once, and such would not be desirable in any event, for to do so would only tie up the telephone system as a result of the alarm being mistaken for receipt of normal phone call. A power distribution network, on the other hand, is not subject to being fouled by the consequences of the reception of alarms, and it is, of course, adequately powered to operate all alarms in the community simultaneously.

The continuity with which regular electric power service is maintained in actual practice insures that the power network will be available for auxiliary signaling at virtually all times, day or night, year in and year out. By way of contrast, only a few radio broadcasting stations and a comparatively small proportion of radio receivers are operated without shutdown on a 24-hour basis; these are circumstances which seriously limit the use of existing radio facilities for mass warning purposes. To overcome this problem would require setting up special broadcast stations and establishing new channels of signaling for this one express purpose; this in turn would require mass adoption of specially designed receivers which would be expensive to operate on a continuous stand-by basis, as well as being quite costly on an initial basis. Even if a program of this character were undertaken notwithstanding the expense, it would not result in greater coverage or greater reliability than I can obtain at much lower cost through the use of my harmonic signal inductor to transmit signals over the 60 cycle power network; indeed, the operation of most radios and associated audible alarm equipment requires the 60 cycle network and a source of power, so the reliability of their operation is inherently limited to the reliability of the power supply network.

Figure 1:
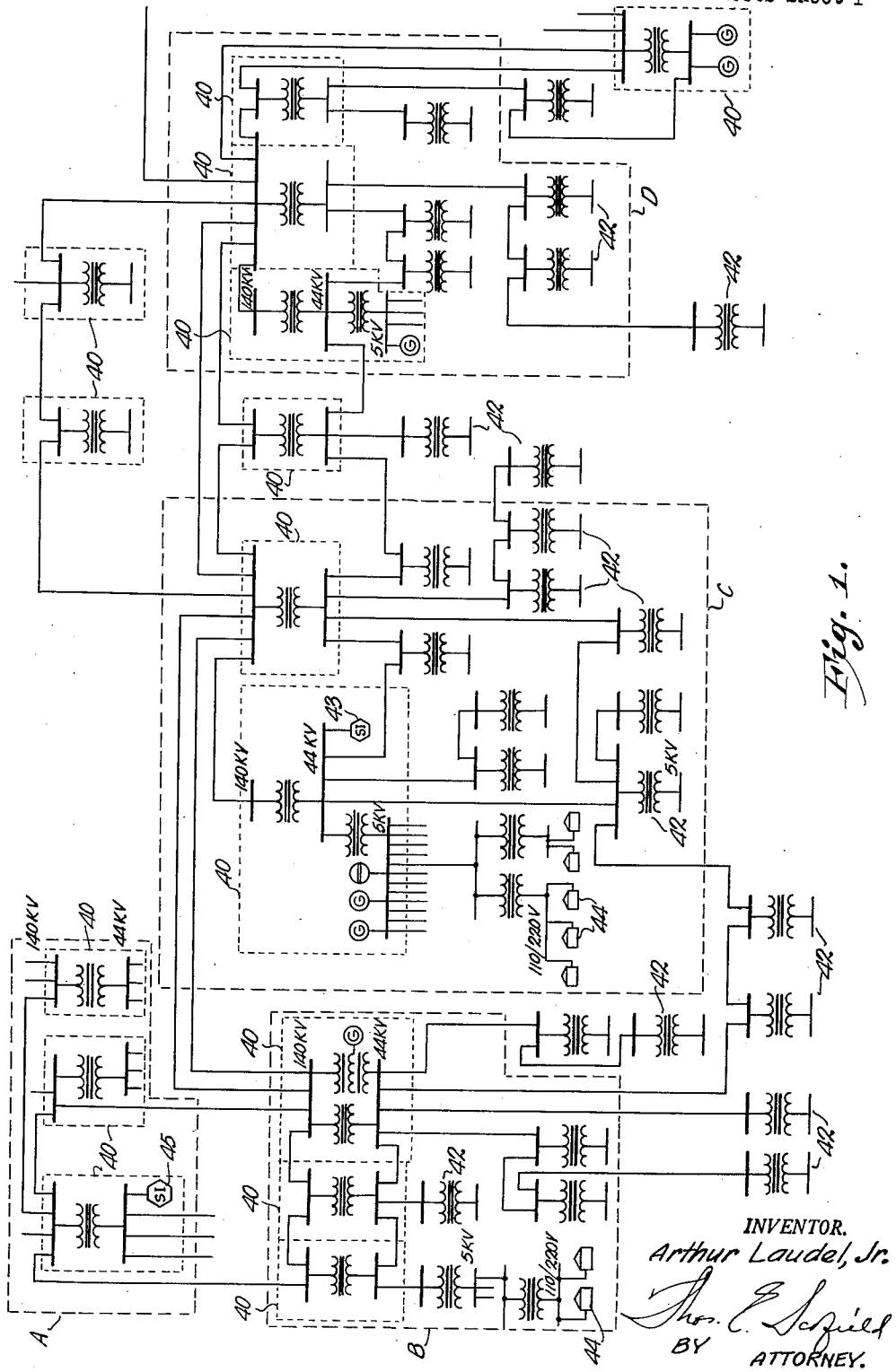

Power supply networks generally are quite complex and it may be helpful in understanding the invention to briefly discuss a typical power system preliminarily, with reference to FIG. 1. This is a highly simplified one-line diagram of a small part of the power network of a utility supplying power to the major portion of a Midwestern State and serving a population of approximately 4,000,000. It is of special interest here for the reason that extensive field tests of the present invention have been made on this network and are still in progress under a program conducted for the Office of Civil and Defense Mobilization.

Shown in the diagram is city A having a population of 250,000; city B (150,000 population) located approximately 40 miles from A; city C (100,000 population) located 30 miles from B; and city D (125,000 population) located approximately 100 miles from A and 40 miles from C. Bulk substations 40 in these four cities are interconnected with a grid of 140 kv. transmission lines and each one also has a transformer serving a 44 kv. subtransmission network which feeds distribution substations such as 42. Some of the latter are located in the cities mentioned, while ten of them shown in FIG. 1 are in outlying locations which serve small communities and surrounding rural areas (8,000 to 10,000 population each).

For reasons which need not be detailed here, 240 cycles was chosen as the optimum frequency for signaling the above areas through the use of one of my harmonic signal inductors installed at 43, the point of connection being a 44 kv. bus in one of the bulk substations in city C. The unit installed is the three phase signal inductor shown schematically in FIG. 18; this will be discussed in some detail later and it will suffice for present purposes merely to mention that it utilized as the inductors three transformers each having a 5,000 kva. intermittent rating (2,000 kva. continuous rating). With this installation a 240 cycle signal having a minimum level of 1320 v. was induced in the 44 kv. bus to which it was connected, the signal voltage thus amounting to approximately 3 percent of the bus voltage.

Within the immediate metropolitan area of 100,000, most homes 44 received, at their 110 v. power outlet receptacles, a level of approximately 2.5 v. of 240 cycle current during signaling. A signal level of 1 v. is adequate for operating home alarm receivers of the tuned frequency or frequency discriminating type. None of the other metropolitan areas indicated in FIG. 1 received the requisite 1 v. level, but levels of .7 v., .65 v. and .4 v. were received respectively in cities D, B and A. Even the lowest of these levels is quite adequate to operate some types of receivers, but is not considered sufficient for reliable operation of mass produced, inexpensive home receivers of the type contemplated for alerting the public at large.

Another harmonic signal inductor 45 subsequently was installed in city A, about 60 miles away from C. This was essentially like the unit shown in FIG. 18, but was modified to employ features shown in FIG. 14; it utilized transformers of similar rating though these were designed to operate at a higher flux level. The second unit was connected to operate in parallel with inductor 43, and experience shows that they remain in phase or at least within 20° of being in phase at all times whereby their signals were additive. With both signal inductors operating, all four of the cities shown in FIG. 1 received the 240 cycle signal at levels well above the desired 1 v. and substantially all other areas shown on the figure had one volt or more available at the 110 v. outlets for signaling purposes. The total area covered by the 1 v. signal (at receivers) was over 16,000 square miles representing a population of more than 1,200,000. An adequate signal was maintained 200 miles away, and at some points even as far as 300 miles away there was an .8 v. signal in the power outlets.

Although the maximum effectiveness of my novel signaling arrangement is realized in its application to polyphase power systems of the type regularly employed by public and private utility companies engaged in the generation and distribution of electric power on a commercial basis, it can also be utilized in single phase lines and networks. And notwithstanding the fact that use in a single phase system does not obtain all of the advantages that can be achieved when my invention is used in a three phase system, the single phase arrangements are generally simpler and easier to understand, so it will perhaps be well to begin by describing the invention in connection with them.

Referring then to FIG. 2, conductors 46a and 46b represent a short section of two conductor single phase power line forming part of the path via which alternating current power is fed from a source 47 to a load 48. The showing of a single source 47 and a single load 48 is intended only to be exemplary for it represents a situation not ordinarily encountered in practice, as we have seen from FIG. 1. Much more common is the situation in which there are multiple sources and/or multiple loads with a labyrinth of interconnections between them including, as part of the network, a line such as 46. While these factors complicate the transmission of signals they will be disregarded for the moment and all sources from which line 46 receives power will be considered as lumped at 47; and likewise all loads to which power may be fed through the line will be considered lumped at 48.

Shown between conductors 46a and 46b is a rather simple version of my harmonic signal inductor. Its principal component is a transformer 50 whose core is constructed of cold rolled grain oriented silicon steel so that its flux-magnetomotive force curve (sometimes referred to as its hysteresis loop or B–H curve) has a relatively sharp knee. All versions of my harmonic signal inductor utilize transformers having this essential characteristic; very satisfactory for the purpose are conventional power distribution and substation transformers of standard manufacture, as has been verified in numerous field tests which I have made on various sizes ranging from 3 kva. to 5,000 kva. transformers, as well as laboratory tests on these and other sizes outside the range specified.

As will be seen, the secondary winding 50b of the aforementioned transformer is connected to a circuit including, in series, a normally open switch 51, a battery 52 and a variable resistor 53. Another normally open switch 55 is arranged, upon being closed, to connect the primary winding 50a of the transformer to conductor 46a, which places this winding in direct shunt relation to the power line. Actually, satisfactory operation can be obtained with switch 55 permanently closed so that the primary winding of the transformer is permanently bridged across the power line; or, stated differently, this switch and the reactor 56 bridging it can in fact be eliminated, altogether, in most instances. Their presence is necessary or desirable under certain conditions of operation which will be explained presently, but it will facilitate understanding of the operation of my harmonic signal inductor if it is assumed for the time being that switch 55 is permanently closed (or that this switch is omitted and primary winding 50a is connected directly and permanently across the power line).

Beginning with the foregoing assumption, it can be said that with switch 51 opened, as shown, my harmonic signal inductor is in stand-by or nonsignaling condition. Transmission of the signal is effected by closing switch 51 for a brief interval, and on any given occasion this may be done a single time or may be repeated in order to send a coded signal. The signal induced in the line at points E, F during the signaling interval comprises significant quantities of the second, third, fourth and fifth harmonics of the fundamental 60 cycle power line frequency; some higher order harmonics also are present, but generally speaking these are not of sufficient strength to be of practical value for signaling purposes, so will be disregarded here.

The strength of the aforementioned lower order harmonics is controlled by several factors. The first that warrants consideration is the value of the direct current flowing in the secondary winding of the transformer 50 when switch 51 is closed, it being obvious that this can be varied by adjustment of the resistor 53 or by changing the voltage of the battery 52. As determined from actual tests, adjustment of the resistor to vary the level of direct current excitation applied to the secondary winding, all other conditions remaining the same, changes the magnitude of the various harmonic currents flowing in the primary winding 50a in the manner indicated in FIG. 19, with corresponding changes in the level of the fundamental (60 cycle) current, as well as in the level of the total current (R.M.S.) flowing in the primary, all as illustrated. The particular transformer employed in obtaining data for the FIG. 19 curves had its primary winding tap so chosen as to maintain the transformer core at a standard flux density of 17 kilogauss (R.M.S.) with switch 51 open; also the voltage of battery 52 was 1.4 times the R.M.S. secondary voltage of the transformer. These are typical values and the curves are typical of results obtained in many such tests.

Figure 19:
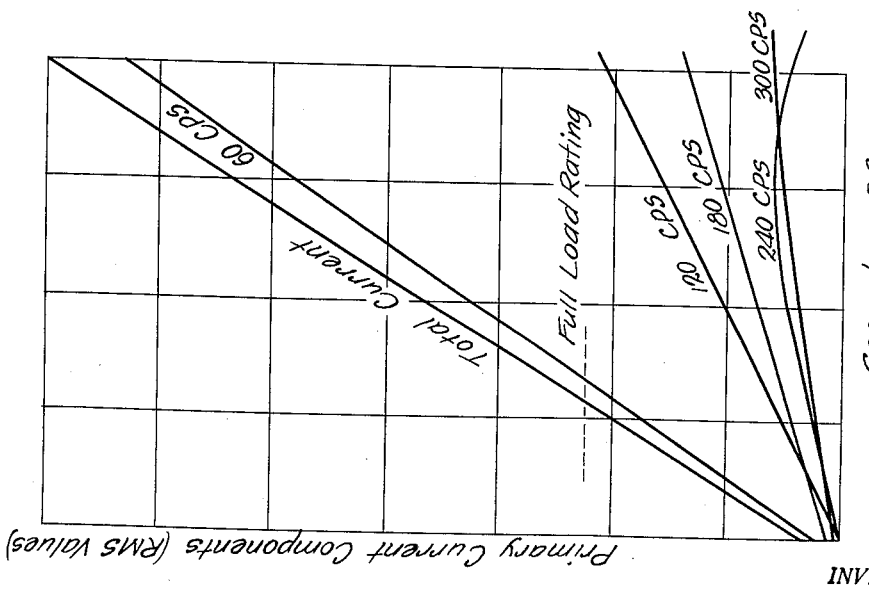
FIG. 19 is a graph comprising a family of curves which reflect changes that occur in the harmonic content of the current produced in the primary winding of the signal inductor shown in FIG. 2 under different conditions of direct current excitation of the secondary winding.

Examining FIG. 19 more closely, it may be noted that when the direct current supplied to the secondary winding 50b is reduced to zero—this being the condition which obtains when switch 51 is open—there still is a small amount of current flowing through the primary winding 50a due to the latter being permanently connected to the power line. This, of course, is the stand-by exciting current drawn by the transformer, and since the core and winding losses are low it is too small to be of any concern. The stand-by exciting current is composed principally of a reactive 60 cycle component with small amounts of third and fifth harmonics. No second or fourth harmonic is present under this condition.

During signal transmission both second and fourth harmonic currents appear in the primary winding, the level thereof increasing with increasing levels of direct current in the secondary winding, as is true of the odd harmonics also; however, there is a falling off in the level of the fourth harmonic (240 cycles) which begins to occur when the total primary current has risen to a point slightly beyond twice the full load rating of the transformer. It is postulated that the other harmonics would fall off similarly at higher levels of direct current excitation but since this would involve severe overloading of the transformer, no attempt has been made to determine the point at which it would occur.

For reasons explained in my Patent 2,906,897, the second and fourth harmonics are, in most situations encountered in practice, superior to the third and fifth for the purpose of signaling over power lines. Although it is evident from FIG. 19 that my harmonic signal inductor produces relatively higher levels of second harmonic than fourth harmonic current, other considerations involved in the transmission and reception of these harmonics throughout a conventional power distribution network will usually tip the scales in favor of using the fourth harmonic (240 cycles) as the preferred signalling frequency.

In terms of obtaining the maximum output of fourth harmonic from my signal inductor, it would appear from FIG. 19 that, with the battery voltage specified, the direct current excitation supplied to the secondary winding of transformer 50 should be adjusted by means of the resistor 53 to a level which will make the total load current in the primary winding approximately twice the full load rating of transformer 50. Further overloading the transformer by still further increasing the direct current excitation of the secondary winding, in other words, apparently would gain nothing further so far as enhancing the output of fourth harmonic current. Actually this is true so long as the core of transformer 50 is operating at a fixed flux density level (17 kilogauss) as was the case in obtaining the curves shown in FIG. 19.

However, transformer 50 has provision for increasing or decreasing the flux density of its core by changing the taps on the primary winding 50a. The results obtained when this is done are reflected in FIG. 20. As will be seen, at any given level of direct current excitation of the secondary winding the total current flowing in the primary winding will be increased (and the levels of the second and fourth harmonics likewise will be increased) when the flux level of the core is increased. Although not shown in FIG. 20, the same is true of the third and fifth harmonics of the fundamental frequency.

Figure 20:
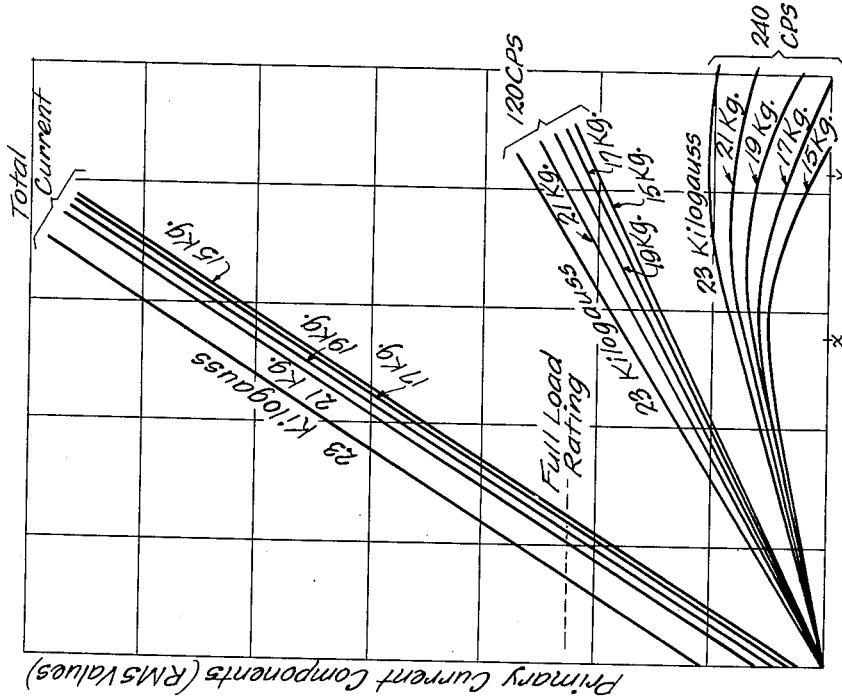
FIG. 20 is a graph similar to FIG. 19, but showing, in addition, the effect of changes in the level of the flux density in the core of the harmonic inductor shown in FIG. 2.

Referring still to FIG. 20 and particularly to the family of curves reflecting the output of fourth harmonic current at different flux levels of the core, attention is directed to the fact that, as was suggested earlier, no substantial improvement in output of the fourth harmonic can be obtained by increasing the D.C. excitation of the secondary winding above the level indicated by line X if the transformer has been adjusted so its core is at the 17 kilogauss level; however, by readjusting the primary winding taps for operation at the 23 kilogauss level, the fourth harmonic output current can be approximately doubled by increasing the D.C. excitation to the level indicated by line Y.

If this is done, the total current flowing in the primary winding of transformer 50 during the signaling interval obviously will far exceed the full load rating of the transformer. However, since the signaling duration will normally be limited to about three minutes with perhaps a maximum of five minutes' operation in any one hour, the transformer can, for my purposes, be given a thermal rating of 2½ to 4 times the current which it could sustain for continuous operation. Subject only to this limitation, it obviously is possible to operate the signal inductor at an abnormally high flux density level and thus obtain a much higher level of harmonic signal current than otherwise could be obtained.

One other factor must be taken into consideration in doing this. Assuming a flux density of, say, 23 kilogauss is chosen, if the primary winding 50a (FIG. 2) is permanently connected in shunt relation to the power line conductors 46a and 46b, the current flow to this winding even when the direct current excitation of the secondary is reduced to zero—the condition which obtains when switch 51 is opened—would still amount to approximately 40 percent of the full load rating of the transformer, as will be evident from FIG. 20. Stated differently, operation of the signal inductor at the highest flux levels during the signaling interval makes it essential to provide a switch such as 55 (FIG. 2) which opens to disconnect the primary winding from the line during the nonsignaling interval in order to eliminate the excessive primary exciting current and excitation core loss which otherwise would be present during stand-by. When the primary taps are adjusted so that the transformer operates at a flux density of no more than 18 or 19 kilogauss—which I have found by experience to be very adequate in most situations—the primary winding can remain permanently connected to the power line without the exciting current and excitation core loss during stand-by being excessive, and consequently the primary switch 55 can be eliminated as previously suggested.

For a better understanding of the operation of the harmonic signal inductor shown in FIG. 2 reference is made to FIG. 21 which graphically illustrates various relationships that exist in inductor 50 when its primary winding 50a is permanently connected to the power line and adjusted to produce an A.C.-induced flux level of approximately 17 kilogauss (R.M.S.) in the core.

Let us first consider the stand-by condition existing when switch 51 is open. The voltage 60 across the primary winding 50a is, of course, the power line voltage; this can be assumed to be essentially sinusoidal as is usually the case, although it should perhaps be mentioned in passing that the presence of harmonic component voltages up to 40 percent of the R.M.S. value of the power line voltage does not appreciably affect the level of harmonic component currents that will flow in primary winding 50a during signaling.

Given the sinusoidal voltage wave 60, the flux curve 61 also is sinusoidal but lags the voltage curve by 90°. With the flux excursion as shown at 61, the core of the transformer, which is constructed of a typical good grade of cold rolled grain oriented silicon steel, will have a response as illustrated in the flux-magnetomotive force curve 62. This flux-M.M.F. loop is symmetrical about both axes, and as is evident the flux level is just entering the saturated region due to the setting of the tap switch for the primary winding 50a to produce the aforementioned 17 kilogauss flux level.

Under these conditions the exciting current which flows through the primary winding 50a has a wave form as shown at 63. Those versed in the art can perceive by inspection that this wave contains no even harmonics but does contain, in addition to the fundamental 60 cycle current, components of third, fifth and seventh harmonics in progressively diminishing portions, the quantity of seventh harmonic being almost negligible.

Having considered the relevant wave forms under standby conditions, let us turn to those which exist during the signaling interval, that is to say when switch 51 (FIG. 1) is closed. Although not shown, there is, of course, a voltage across the terminals of the secondary winding 50b which, like the flux, is essentially sinusoidal but which lags the flux by 90°. Because of this voltage an alternating current flows through battery 52 and resistor 53 in addition to the direct current produced by the battery itself. Since the only A.C. load on the secondary winding 50b is the resistor 53, the total secondary current 64 is a sine wave which is in phase with the secondary voltage; this sine wave is displaced from the symmetrical axis by the amount of the direct current supplied by battery 52. As a result, the flux-M.M.F. loop is no longer symmetrical about the flux axis but rather takes the asymmetrical shape shown at 65. It will be seen from this that because the direct current in the secondary circuit has a positive polarity, the flux is driven far into positive saturation by this additional magnetomotive force and is stopped short of its former amplitude in the negative direction. The total flux excursion remains the same as before since the primary voltage 60 and the flux 61 remain essentially unchanged, save for the displacement of the flux wave due to direct current excitation.

The total current producing the magnetomotive force on the core during the signaling interval has the wave form shown at 66. This total current is the summation of the secondary current 64 and the primary current 67. Harmonic analyzer measurements of the primary signal current 67 establishes that it contains, in addition to the 60 cycle fundamental, substantial quantities of second, third, fourth and fifth harmonics, together with relatively small quantities of higher order harmonics.

Introducing the signal current which flows in the primary winding 50a (FIG. 2) into the power line to which that winding is connected produces a voltage across the line at the insertion points E, F. The 60 cycle voltage induced by the reactor is equal to the 60 cycle current times the effective 60 cycle impedance of the power system or network, considering this impedance as lumped at the insertion point; since the induced current is almost completely reactive and inasmuch as the system power factor is relatively high, the induced 60 cycle voltage is added almost at right angles to the 60 cycle applied voltage, and the change in the latter therefore is negligible.

In like manner each harmonic current component represented in the output of my signal inductor produces a voltage, the magnitude of which is equal to the particular harmonic current times the system impedance at that frequency. There is no appreciable amount of second or fourth harmonic in the normal power system, so in the case of 120 and 240 cycles, the magnitude of voltage induced by my signal inductor represents the insertion voltage of these signal components. Third and fifth harmonics, on the other hand, normally are present at substantial levels on the typical power line; the additional components of these odd harmonics which are induced during the signaling interval may have any phase relationship with the corresponding harmonics already present, and therefore may serve to add to the latter, or may subtract from them or may be at any angle with respect thereto.

Returning briefly to FIG. 2, reference already has been made to the need for providing a switch 55 in series with the primary winding of the transformer 50 if the latter is arranged to operate at an abnormally high flux level for the purpose of enhancing the output of harmonic signaling currents. When such a switch is provided, it can be designed to open and close simultaneously with switch 51. Alternatively, in cases where it is desired to transmit a coded signal, switch 55 can be closed preliminarily and maintained in that condition while switch 51 is alternately closed and opened the desired number of times in accordance with the code to be transmitted, following which switch 55 is reopened.

Strictly speaking it is not absolutely essential that switch 55 be bridged by a reactor 56 as shown. However, provision of the reactor gains several advantages which may perhaps not be immediately apparent. First, the switch 55 can have a reduced interrupting rating inasmuch as, upon opening, it bypasses current through the reactor 56, rather than being obliged to interrupt the full value of the current flowing through the primary winding 50a of the transformer. Second, and more important, if reactor 56 were omitted, switch 55 would be required to have a high inrush rating because of the high flux level in the core of transformer 50 and the possibility of its having residual magnetism exactly out of phase with the suddenly applied line voltage. Provision of the reactor 56, however, insures that the flux in the core of the transformer always is maintained approximately in phase with the applied line voltage, whereby the inrush current is reduced to about one-tenth, with a proportionate reduction in the required inrush rating of the switch. This is exceedingly important inasmuch as inrush current is probably the most severe duty which the switch otherwise would encounter.

Figure 3:
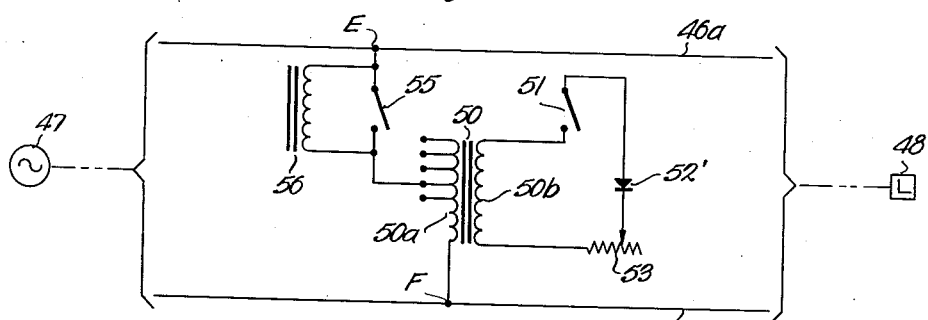

The harmonic signal inductor shown in FIG. 3 is identical to that shown in FIG. 2 except that battery 52 has been eliminated and a rectifier 52' substituted in its place. All of the other components being the same as in FIG. 2, they have been identified by similar reference numerals.

As already explained in connection with FIG. 2, the switch 55 of FIG. 3 can be eliminated or left permanently closed unless the transformer 50 is to be operated at an abnormally high level of flux density. Assuming that this is not the case and that the primary winding 50a of the transformer therefore is permanently connected in shunt relation to the 60 cycle power line 46a, 46b, transmission of the harmonic signal will be initiated by closing switch 51 and terminated by reopening of the switch. With switch 51 closed, the voltage induced in the secondary winding 50 will, on each half cycle, cause current to flow through the rectifier 52' and resistor 53. The wave form of the resultant secondary current is not greatly different from that shown at 64 in FIG. 21. Although the pulsating direct current which thus flows through the secondary winding of the transformer represents a moderate departure from the sinusoidal wave form 64 obtained in the FIG. 2 arrangement, the results are very similar. In other words substantial quantities of second, third, fourth and fifth harmonic currents are caused to flow in the primary winding 50a, with the result that these harmonics appear as signal voltages across the points E, F of the power line.

The relative strength of the induced harmonic signal currents obtained in FIG. 3 are essentially the same as indicated by the curves in FIG. 19. More specifically, as the self-induced secondary excitation current (FIG. 3) is increased and decreased in level by means of the variable resistor 53, the changes in the harmonic signal currents flowing in the primary winding 50a are so nearly identical to those reflected in FIG. 19 as to be a virtual duplication. Similarly as the flux level in the core of transformer 50 (FIG. 3) is adjusted by means of the taps on the primary winding 50a, essentially the same results are obtained as those reflected in FIG. 20.

At the higher flux levels it is necessary or desirable to provide the FIG. 3 arrangement with a switch 55 and bridging reactor 56 for the same reasons as discussed in connection with FIG. 2. On the other hand, at normal flux levels this switch and reactor can be omitted, again for the same reasons as previously given. If a switch 55 is employed, it can be coupled with the switch 51 so that the two will open and close simultaneously or nearly simultaneously. On the other hand, if it is desired to transmit a coded signal, it is preferred to close switch 55 preliminarily and maintain it closed throughout the period of time that switch 51 is being opened and closed to transmit the code.

Let is be assumed for a moment that transformer 50 (FIG. 3) is arranged for operation at a normal flux level rather than an abnormally high level. Under such circumstances it is not essential that switch 55 be bridged by a reactor 56 and the reactor can be omitted. Also switch 51 can be permanently closed or, in lieu thereof, can be omitted so that the secondary winding 50b of the transformer is connected directly and permanently to the rectifier 52' through resistor 53.

With this arrangement, the harmonic signal inductor is under control of a single switch (55) which is closed to initiate transmission of a signal and opened to terminate transmission. It will be obvious that the harmonics induced in the power line 46a, 46b during a signaling interval are precisely the same as have already been described; elimination of switch 51, in other words, does not in any way alter the kind, character or magnitude of the harmonic signals transmitted. However, during stand-by or nonsignaling condition, the opening of contact 55 completely disconnects the primary winding of transformer 50 from the power line so that no stand-by current whatever is drawn.

To summarize the foregoing, we have seen in the case of FIG. 3 that signal transmisison can be controlled by any one of several different switching arrangements: first, switch 55 can be eliminated and signaling controlled solely by the closing and opening of switch 51; secondly, switch 51 can be eliminated and signaling controlled solely by switch 55'; finally, signaling can be controlled jointly by the two switches, either by operating them simultaneously or sequentially as has been described. Each of these three alternatives offers some advantage or advantages which the others lack, and which will prove the most useful in any given installation usually will depend upon the requirements to be met.

Referring now to FIG. 4, conductors 70a and 70b represent a short section of three conductor single phase power line forming a part of a power system network. Power from the source 71 is fed via opposite sections of line 70 to the pair of transformers 72 comprising the principal components of the harmonic signal inductor. The primary windings 72a are connected in series additive while the secondary windings are connected in series bucking. Accordingly, when a voltage is applied at 70a, 70b and 70c only a small amount of harmonic voltage will appear across GH, the bucking connection of the secondary windings.

With switch 73 open, the inductor is in the nonsignaling condition. When this switch is closed, current flows from the battery 74 through switch 73 and the secondary windings 72b. (To replace the energy used by the battery during signaling a trickle charger consisting of a transformer 77 connected to a power source 70a, 70b a bridge rectifier 76 and a variable series resistor 75.)

Assuming switch 73 is closed and that direct current is flowing in the secondary windings of the transformers 72, a signal current will flow in each primary winding 72a. No signal voltage is produced between lines 70a and 70b; rather, all of the signal voltage appears between lines 70a and 70c for one of the transformers 72, and between lines 70b and 70c for the other transformer.

Wherever this type of signal inductor can be used it represents a considerable increase in efficiency when compared to the single phase unit represented in FIGS. 2 or 3. No secondary load current flows and, by eliminating the secondary load current, the 60 cycle current flowing in the primary as well as the total current flowing to the inductor are both reduced considerably for the same value of D.C. excitation.

FIG. 22 comprises a family of curves showing the effect of different levels of direct current excitation on the harmonic inductor of FIG. 4, when the flux level of the core of transformers 72 is 17 kilogauss. Comparing FIG. 22 with FIG. 19, which is the corresponding family of curves for the typical single phase signal inductor in FIG. 2 it may be noted that signaling efficiency (240 cycle signal current divided by total current) is approximately doubled. Only one type of signal inductor, the three phase, has a higher signaling efficiency.

Figure 5:
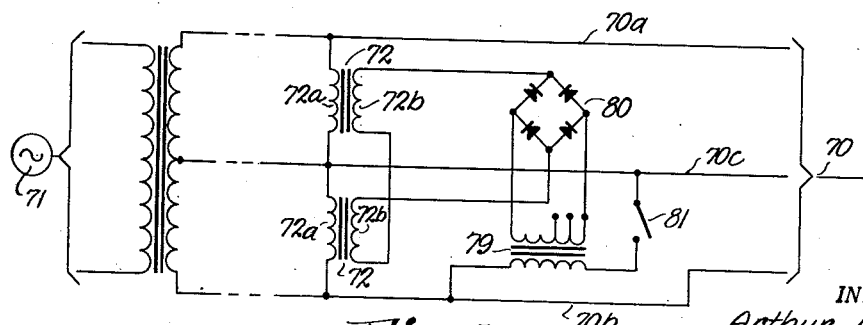

The signal inductor shown in FIG. 5 essentially is the same as the signal inductor in FIG. 4 except in two respects: First, battery excitation of the secondary windings of transformer 72 has been eliminated, and in place thereof power received via transformer 79 is rectified by the bridge 80 and supplied to the secondary windings of transformer 72 during the signaling interval. Second, a switch 81 is employed to initiate and terminate signaling. Closing switch 81 supplies the D.C. to the signal inductor windings 72b and the signal is produced as in FIG. 4. The amount of signal output, since it is proportional to the direct current in the secondary winding can be changed by changing the secondary taps on transformer 79. The performance of the signal inductor in FIG. 5 is the same as the signal inductor in FIG. 4 with the exception of the source of the direct current.

Referring next to FIG. 6, conductors 100a, 100b and 100c represent a section of three conductor three phase power line forming part of the path via which alternating current power is fed from a source 101 toward a load 102. For convenience the source has been shown as a delta secondary winding of a transformer, but it will be understood that this is merely exemplary and not intended to be limiting. Likewise it is only in the interest of simplicity that a single source and a single load have been shown, for this represents a situation which is not ordinarily encountered in practice. Rather, as we have seen from FIG. 1, the much more common situation is one in which there are multiple sources and multiple loads with a network of interconnections between them, including as part of the network a line such as that illustrated in FIG. 6.

Connected to conductors 100a, 100b and 100c is a delta connected primary 103a of my harmonic signal inductor. This comprises a three phase bank of transformers 103 whose cores 103b are constructed of grain oriented steel so that the flux-magnetomotive force curve has a relatively sharp knee.

The secondary windings 103c are connected broken delta in series with a normally open switch 104 and a battery 105. To replace the energy consumed during signaling the battery is continuously trickle charged through the limiting resistor 106 by the bridge rectifier 107 which receives an A.C. supply through a transformer 109.

It will be assumed that the harmonic signal inductor transformers 103 are of standard construction and have a primary voltage rating, which produce 17 kilogauss flux density in the cores 103b as a result of the voltages applied between 100a and 100c, 100c and 100b, and 100b and 100a. The harmonic signal inductor, as shown, is in the stand-by, nonsignaling condition. Transmission of the signal is effected by closing switch 104 for a brief interval or for a predetermined pattern of brief intervals for a coded signal. The signal induced in the line 100 during the signaling interval comprises significant quantities of the second, fourth and fifth harmonics of the fundamental 60 cycle power line frequency; some higher harmonics also are present but these are generally not of sufficient strength to be of any practical value for signaling purposes.

The signal strength of the useful lower harmonics is determined almost entirely by the current which will flow from battery 105 and limited primarily by the resistance of the secondary windings 103c and thence through the switch 104. The signal level, therefore, is determined by the selection of the voltage rating of the battery 105. There is a limited useful range for battery voltages as would be indicated from a study of FIG. 23. Here, the signal level of the lower harmonic components of the current flowing in the primary winding of each transformer 103 during signaling are plotted against corresponding values of D.C. excitation current flowing in the secondary winding, all other factors remaining constant.

It will be seen that the even harmonics (120 cycles and 240 cycles) are at zero when the direct current in the secondary winding is at zero (this being the condition when switch 104 is open). With increasing amounts of direct current flowing in the secondary winding the even harmonic content of the resulting primary current increases. There is, however, a decrease in the amount of the fourth harmonic (240 cycles) which begins to occur when the total primary current has risen to a point slightly beyond the full load rating of the transformer. It is postulated that other harmonic currents would exhibit a similar pattern at even higher levels of direct current excitation, but since this would involve a considerable overload of the transformer it represents an impractical condition of operation. Laboratory measurements were not carried beyond the point where the second harmonic (120 cycles) began to decrease.

Comparing FIG. 23 with FIG. 19 the three phase signal response to excitation may be compared with the single phase response. In the FIG. 23 the 240 cycle current is approximately double the 240 cycle current in FIG. 19 at all values up to the full load rating. (It must be noted that the vertical scale of FIG. 19 at full load, is one-half the value of the full load point on FIG. 23 indicating that the values on the single phase vertical scale intervals are double those on FIG. 19.) However, at twice the rated load the single phase 240 cycle current is essentially equal to the three phase 240 cycle current at full load. This indicates equal signal capability for a given size transformer for three phase or for single phase, but that the single phase signaling efficiency is about one-half that of the three phase signaling efficiency.

Approximately half the current flowing in the primary of the single phase inductor (see FIG. 2) during signaling is a 60 cycle current being supplied to the secondary resistance. Better signaling efficiencies would occur if no load current were flowing. This cannot be achieved in an arrangement like that in FIG. 2, but can be obtained with one like that shown in FIG. 4. Thus, comparing FIG. 23 to FIG. 22 where one single phase 60 cycle voltage is being used to buck the other, the signaling efficiencies are essentially the same. The three phase unit produces approximately 5 percent more 240 cycle voltage than the bucking single phase unit; this is due primarily to the blocking of the third harmonic in the three phase inductor. This difference is exemplified by observing the three phase harmonic currents in FIGS. 19, 22 and 23 and noting almost the complete absence of third harmonic from the three phase unit.

The 240 cycle response of the three phase signal inductor with respect to increased flux levels is quite similar to the response of the single phase units. Comparison of the second and fifth harmonic curves show that they bear the same relation, one to another, that the 240 cycle current curves did.

The total 240 cycle signal output of the transformer is approximately the same for a single phase inductor or a three phase inductor and occurs at approximately the same D.C. excitation current.

For a better understanding of the operation of the harmonic signal inductor shown in FIG. 6, reference is made to FIG. 21 which graphically illustrates some relationships that exist in the typical three phase inductor as well as single phase inductor connected to operate at a flux level of approximately 17 kilogauss. The voltage 60 across the primary winding of each transformer 103 during stand-by condition is, of course, the power line phase voltage and can be assumed to be essentially sinusoidal although presence of harmonic voltages up to 40 percent does not appreciably affect the harmonic currents that will flow in the primary windings during signaling.

The flux curve 61 for each transformer 103 is also sinusoidal but lags the voltage curve by 90°. With the flux excursion as shown in curve 61, the core of the transformer which is constructed by a typical good grade of cold rolled grain oriented silicon steel will have a response as illustrated in the flux-magnetomotive force curve 62. This flux-M.M.F. loop is symmetrical about both axes and the flux is just entering the saturated region at 17 kilogauss. Under these conditions the exciting current which flows through each primary winding 103a has a wave form as shown at 63.

The voltage appearing across the terminals J, K of the broken delta (FIG. 6) during stand-by condition when switch 104 is open is almost zero—at 17 kilogauss it can be expected to be on the order of 1/10 of one percent of the secondary phase voltage.

When switch 104 is closed a direct current flows from battery 105, through the three secondary windings 103c. There is a magnetomotive force interaction which occurs during signaling and induces a 180 cycle ripple in the direct current excitation which is approximately equal to the average D.C. current. This ripple is primarily caused by the same factors which produce the circulating 180 cycle current in the primary delta.

The direct current which flows through secondary winding 103c of each single phase transformer of the signal inductor produces a magnetomotive force which displaces the flux from its symmetrical axis. The primary signal current is produced in the same manner as described for FIG. 2.

The total current producing the magnetomotive force on the core of each transformer 103 during the signaling interval has the wave form shown at 66 (FIG. 21). This total current is the summation of the secondary current and the primary current. The primary current has two components, the third harmonic circulating component (approximately equal to and balancing the third harmonic circulating in the secondary) and a signal current. The third harmonic flowing in the primary windings 103a circulates around the delta and does not enter lines 100a, 100b and 100c, so no third harmonic voltage is introduced into the system.

The other harmonic voltages produced in the power system at the insertion point are produced in like manner to those described in connection with FIG. 2.

Continuing with the explanation of the FIG. 6, the entire excitation circuit below points J, K can be removed and the alternate excitation circuit shown in FIG. 7 may be substituted in its place. If this is done, the nonsignaling condition exists when switch 112 is open. To initiate the signal, switch 112 is closed starting the motor 113 which drives the direct current generator 114. As the generator approaches its rated speed it also will approach its rated current and voltage. The current and voltage output is determined by the setting of the field rheostat 115 which is in series with the generator field 116.

Using a generator in this way for excitation of my harmonic signal inductor offers several advantages over the use of a battery. First, the field rheostat 115 offers a continuous and easily changed adjustment of the direct current excitation and therefore of the signal output of the inductor. Second, there is no stand-by power as with the trickle charger. Third, a motor generator set does not deteriorate with age in the same manner as a battery does. In a field test using a motor generator set in conjunction with three 833 kva. standard transformers as the harmonic signal inductor no difference was obtained in the wave shape of the secondary current or in the harmonic analysis of the primary current, as compared with battery excited harmonic signal inductors.

The time required to bring the motor generator up to speed must be added to the signal build up time, and the time required for the motor generator set to coast to somewhere near a stop must be added to the signal decay time. Thus, the motor generator set obviously is not a satisfactory substitute where coding of signals is required.

Figure 7:
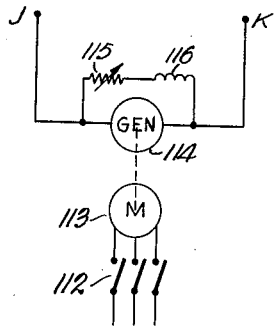
Figure 8:
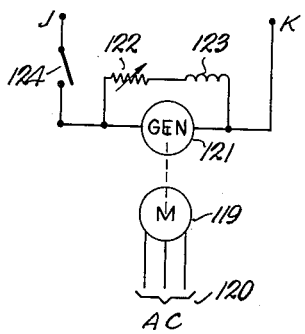

Let it now be assumed that FIG. 8 is substituted for the excitation circuit below points J, K in FIG. 6. The new excitation circuit is shown in nonsignaling condition, with motor 119 connected to an A.C. supply 120 and driving the D.C. generator 121. The field rheostat 122 which is in series with the field 123 may be assumed to have been preset to the desired generator current output for the desired inductor signal output. Closing the normally open switch 124 initiates the signal. This brings about an immediate build up of D.C. excitation for the inductor transformers 103, and opening switch 124 brings about an immediate decay of the excitation current. The advantage when comparing the excitation circuit of FIG. 7 with FIG. 8 is that in the latter the signal build up and decay time are a minimum being limited only by the characteristics of the transformers 103 (FIG. 6).

Figure 9:
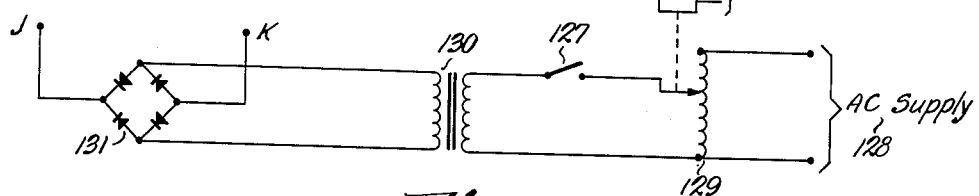

Substituting FIG. 9 at J, K in FIG. 6 establishes still another excitation scheme for the harmonic signal inductor. With switch 127 in open position the inductor is in its nonsignaling condition. Closing this switch causes current from the A.C. supply 128 to flow through the variable auto-transformer 129, thence through the switch 127 and the voltage matching transformer 130 to the bridge rectifier 131 where it is rectified and fed to the secondary windings of the signal inductors 103c.

Even though the direct current output from a full wave bridge rectifier has a considerable 120 cycle ripple when connected to a resistive load and many other types of loads, there is no apparent 120 cycle ripple in the signal inductor secondary 103c. As a matter of fact, extensive tests indicate that for the same value of direct current flowing in the secondary, the signal current produced is the same regardless of whether the source of D.C. excitation is a battery, a generator or a rectified current supply.

Although the excitation arrangement of FIG. 9 may seem somewhat complicated, it offers several advantages. First, switch 127 can be inexpensive because it needs only to break a low value A.C. current at a moderate voltage. By way of contrast, switches 104 (FIG. 6) and 124 (FIG. 8) must be rated to interrupt direct current and must have a current carrying capacity equal to the full D.C. excitation current. Second, maintenance on the excitation system shown in FIG. 9 is very low; with batteries, specific gravity must be supervised and they must be eventually replaced whether they are used or not. Similarly, motor generators must be lubricated and inspected periodically. Transformers 129 and 130 and static rectifiers 131, however, need no such maintenance.

Using the FIG. 9 excitation arrangement, the signal level can be adjusted by means of the variable auto-transformer 129 which controls the magnitude of the direct current supply to the harmonic inductors 103. Through the use of a conventional servo mechanism and motor operator 132, this adjustment conveniently can be made from a remote location and, if desired, may be automatically controlled by conditions (e.g., received signal strength) at that location.

Figure 10:
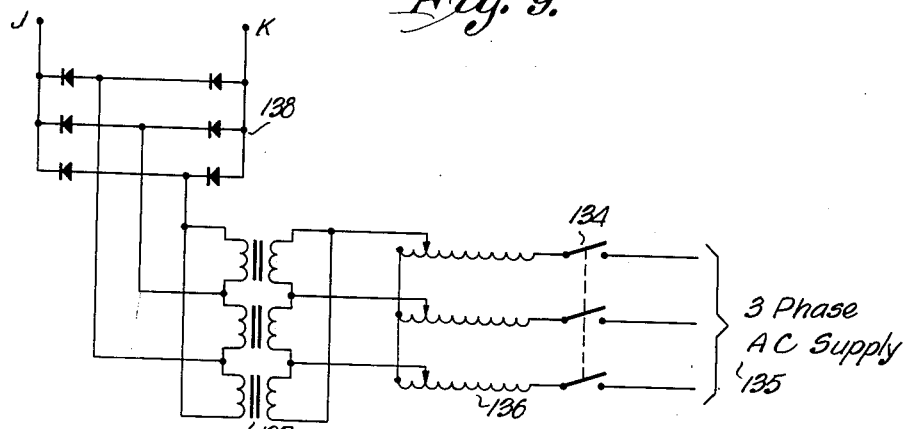

The circuit in FIG. 10 can be substituted in FIG. 6 at J, K for still another alternate excitation method. The normally open three pole switch 134 initiates the signal when it is closed and terminates the signal when it is reopened. Upon being closed, power from the three phase alternating current supply 135 travels through switch 134, the three phase variable auto-transformer 136, the three phase voltage matching transformer 137 and through the three phase full wave bridge rectifier 138, to produce a current through the secondary windings 103c of the signal inductors. The secondary current wave form is virtually the same as with all of the other arrangements heretofore described for supplying direct current excitation to the signal inductors of FIG. 6; likewise, the harmonic signal output from the primary windings 103a also is comparable to that obtained with said other arrangements.

Large signal inductor installations call for large amounts of D.C. excitation power; the three phase supply system shown in FIG. 10 makes it possible to supply this power at lower cost for the equipment than would otherwise be involved. Also, switch 134 affords rapid control over the excitation current, and the harmonic signal build up and decay time therefore is limited only by the signal inductor response, as is true with switches 104 (FIG. 6), 124 (FIG. 8) and 127 (FIG. 9). The advantages of the FIG. 10 excitation arrangement when coupled with the three phase inductor of FIG. 6 led me to adopt this combination in the major field test installation 43 (FIG. 1) mentioned earlier, which was designed to serve a metropolitan area of 100,000 population; the installation is disclosed in further detail in FIG. 18 which will be described presently.

Figure 11:
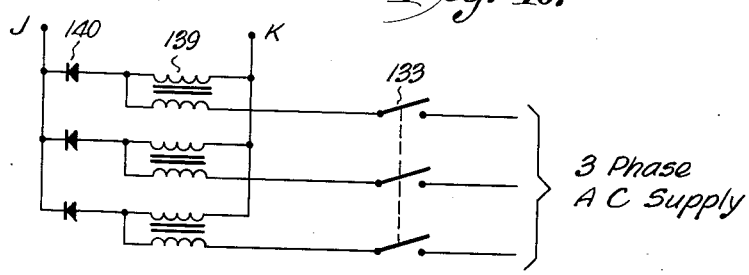

Equally good signal response time can be obtained by substituting FIG. 11 at J, K in FIG. 6 and in some instances the cost of this is lower than that for FIG. 10. It will be seen that closing switch 133 (FIG. 11) initiates the signaling and reopening the swtch terminates the signal. When closed, A.C. current flows from the three phase source through switch 133, the voltage matching transformer 139 and the three phase half wave rectifier 140, causing rectified current to be fed to the harmonic signal inductors 103 (FIG. 6). This excitation current wave form, as well as the harmonic signal output wave form also are comparable with those obtained when the FIG. 10 supply is used.

As has been explained, any one of the six different excitation arrangements shown in FIGS. 6–11, inclusive, may be employed to supply direct current excitation to the harmonic signal inductor of FIG. 6 simply by connecting the one desired to the ends (J, K) of the open delta secondary windings 103c of the three transformers used for the signal inductor. The same six excitation arrangements (FIGS. 6–11) can likewise be used interchangeably with the three phase signal inductor shown in FIG. 12, or with that shown in FIG. 13; in either case the broken delta secondary terminals J, K of the desired three phase signal inductor (FIG. 12 or FIG. 13) are merely connected to the output terminals J, K of the desired excitation arrangement (FIGS. 6–11).

Figure 12:
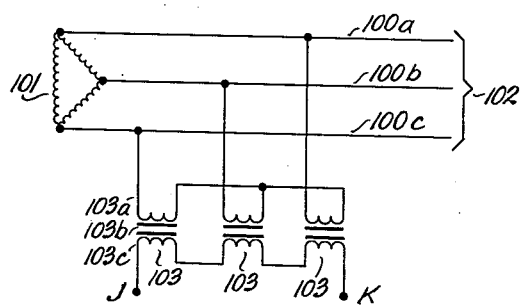
Figure 13:
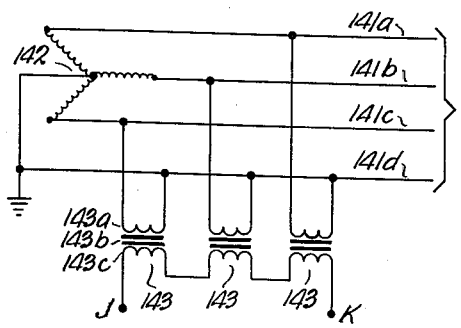

Attention is directed to the fact that the harmonic signal inductor connected to the power line in FIG. 12 utilizes three transformers whose primary windings are connected in ungrounded Y, while in FIG. 13, the primary windings are connected in grounded Y. FIG. 6 differs from both of these in that the primary windings 103a of the three phase signal inductor are connected in delta, an arrangement which provides several advantages over any other type of primary connection. First, there is maximum protection for rectifiers such as shown in FIGS. 9–11 if a fault should appear on the power line to which the signal inductor is connected. In most cases no voltage or a very small voltage will appear across the broken delta J, K and the rectifier. This is true for the two most common faults, the line-to-line fault and the line-to-ground fault. For a Y connection of the primary windings (FIGS. 12 and 13) this is not the case.

A second advantage of the delta primary is a slightly higher signaling efficiency than can be obtained by a grounded Y or an ungrounded Y primary, such as shown in FIGS. 12 and 13. (By signaling efficiency is meant the ratio obtained when the value of 240 cycle current is divided by the total R.M.S. current; on this basis the signaling efficiency of the delta primary is 35 percent while the ungrounded Y primary is 33 percent and the grounded Y primary is 31 percent.) It has been postulated that this slight gain in signaling efficiency through the use of a delta primary is possible because of the low impedance circulating path of the third harmonic in the primary delta.

One disadvantage of the delta primary, on the other hand, is the length of time required for signal build-up or decay. For code transmission purposes, it is desirable that the individual code impulses be as short in duration as it practical to receive. A code pulse duration of between ¼ second and one second would be ideal. However, at 17 kilogauss flux density the time required for the signal to build up to its maximum value is between two and three seconds, and the time required for the signal to decay to below 20 percent of its maximum value is another three to four seconds. A shorter pulse can be obtained by terminating transmission before the signal reaches its maximum level, but even so a signaling interval on the order of three seconds appears to be about the absolute minimum with the delta primary, unless flux level is increased. At higher flux levels, say 19 or 20 kilogauss, the signal build-up time is reduced to approximately a second, the signal decay time is reduced to approximately two seconds and a usable signal of approximately two seconds' duration can be transmitted. Still further reduction can be obtained, however, with the Y primary arrangement shown in FIG. 12.

As previously indicated, FIG. 12 is like the portion of FIG. 6 above points J, K except that the primary windings 103a of the signal inductors are connected to lines 100a, 100b and 100c in an ungrounded Y configuration. Actually, the ungrounded Y connection obtains a considerably different response than the delta connection of the primaries 103a. Referring more particularly to FIG. 12, with the flux level in the cores 103b at 17 kilogauss during nonsignaling condtion, the exciting current in the primary windings 103a will contain almost no third harmonic. There will, however, be a third harmonic voltage appearing across each of these three windings. A voltage can be measured from the ungrounded neutral to ground and is equal to three times the third harmonic voltage across each primary phase winding 103a. This same third harmonic voltage to ground times the transformer turns ratio will appear across the secondary broken delta J, K. Assuming that the excitation setup of FIG. 6 is connected across J, K, the voltage across the switch 104 will be, of course, the broken delta voltage and will be made up of triple harmonics, primarily the third. Whereas the voltage across the broken delta J, K with a delta primary (FIG. 6) is on the order of .1 percent of the secondary phase voltage, the voltage across J, K is above 10 percent with the ungrounded Y primary (FIG. 12). When switch 104 is closed to initiate signaling, the voltage across J, K disappears and the usual current wave form found in the three phase signal inductor secondary is established. The ungrounded Y primary signal current will have a slightly lower 240 cycle component than a delta connected primary.

The ungrounded Y connection permits a much faster rise in signal as well as shortening the decay time of the signal. Thus, ungrounded Y connected signal inductors are especially suited for coding.

The generators in FIGS. 7 and 8, if connected to the points J, K of FIG. 12 can have the same rating as they did on FIG. 6; however the rectifiers in FIGS. 9, 10 and 11 must have a higher peak inverse voltage rating when connected to FIG. 12 than for service on a delta (FIG. 6). This is because of the high third harmonic voltage which appears across the rectifier during the first instant of signaling. Also, if one of the power lines 100a, 100b or 100c in FIG. 12 should become grounded or connected to one of the other lines, a full secondary phase voltage would appear across the rectifier (FIGS. 9, 10 and 11). For system reliability, therefore, a higher peak inverse voltage rating rectifier or elaborate protective equipment are required. The signal output remains unchanged whether rectifiers, generators or batteries are used, and subject to the foregoing considerations the excitation arrangements in FIGS. 6–11 all can be used with FIG. 12.

FIG. 13 is generally similar to FIG. 12. The power supply line is four wires, with three phase leads 141a, 141b and 141c and a grounded neutral 141d. The signal inductor primary windings 143a are connected grounded Y. The flux level in the core 143b will be the standard 17 kilogauss and the secondary windings 143c are connected, as usual, in a broken delta. The excitation circuits in FIGS. 6, 7, 8, 9, 10 and 11 can be used interchangeably across J, K. The stand-by voltage at J, K produced from the secondary broken delta will be very low because any third harmonic currents in the primary will flow through the neutral.

The advantage of the grounded Y primary is that transformers having a minimum basic insulation level can be used in the signal inductor. Transients occurring on the power line, line-to-ground faults and line-to-line faults will cause a high voltage to appear across the broken delta and require rectifiers with a higher peak inverse rating or considerable protective equipment. The secondary current wave shape and the harmonic analysis of the primary current is similar to that of the ungrounded Y (FIG. 12) or the delta primary (FIG. 6) connection.

As we have seen, the three phase signal inductors in FIGS. 6, 12 and 13 all have their primary windings connected directly and permanently to the associated power line, this connection embodying a delta configuration of the windings in FIG. 6 and a Y configuration in FIGS. 12 and 13. During stand-by or nonsignaling condition, the primaries obviously will draw some current from the power line in each case, but the amount is too small to be of concern if the primary connection of each transformer is such that the flux density of the transformer core is of the order of 17 kilogauss (R.M.S.) as has been assumed, 18 kilogauss being about the maximum allowable before serious losses are encountered under stand-by conditions.

Higher flux levels that this will result in transmission of stronger harmonic signals during the signaling interval, but to achieve this end it is necessary to provide a switch which opens to cut off current flow in the primary windings during standby, as has been explained in connection with FIG. 2. Such switches have been shown at 147 in FIG. 14, at 152 in FIG. 15 and at 154 in FIG. 17, each of these being a three-pole switch. To permit using switches having a lower inrush current rating, etc., it is desirable that each pole be bridged by a reactor such as 147 (FIG. 14) or 151 (FIG. 15) as discussed with reference to FIG. 2, but this is not absolutely essential (see FIG. 17), particularly in installations employing transformers that are arranged to operate at a flux level only moderately in excess of 17 kilogauss.

Figure 14:
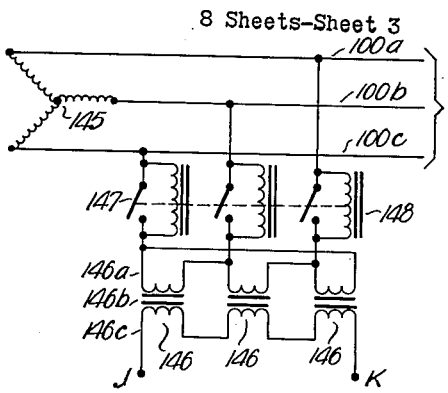

Except for the addition of the three-pole switch 147 and the current-limiting reactors 148, FIG. 14 is like FIG. 6 in that it employs a three phase harmonic signal inductor whose primary windings are connected in delta to conductors 100a, 100b and 100c of a line that is powered from a conventional three phase source shown schematically at 145. The secondary windings 146c comprise a broken delta, the ends of which (J, K) can be connected to any one of the excitation arrangements shown in FIGS. 6–11.

The excitation arrangement of FIG. 10 was chosen for use with the signal inductor of FIG. 14 in the actual field test installation made at 45 (FIG. 1) where it provided adequate signal strength to serve a city of 250,000 population, as well as extending into the surrounding areas to augment the signal received from another harmonic inductor 43 installed sixty miles away in a city of 100,000 population. The latter installation employed the same excitation arrangement, in combination with the three phase inductor shown in FIG. 6, and thus differed only in that it lacked the primary switching facilities 147, 148 of FIG. 14. Due to this difference, however, it was possible to operate the inductor installation 45 at a flux level of 23 kilogauss, producing a considerably higher 240 cycle signal current output than obtained with the inductor installation 43, which was operated at 17 kilogauss.

Using the FIG. 14 arrangement, it will be understood, of course, that the harmonic signals will be induced in line 100a, b, c only when switch 147 and the switch in the associated D.C. excitation arrangement are both closed. In practice the two switches can be coupled to open and close simultaneously or substantially simultaneously; alternatively, if it is desired to transmit a code, one of the switches can be maintained closed for a predetermined interval of time, during which the other is repeatedly opened and closed, all as explained in connection with FIG. 2.

Figure 15:
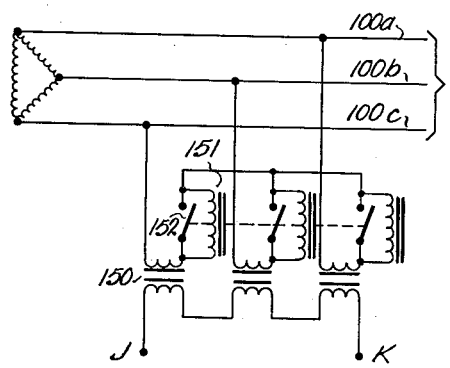
Figure 16:
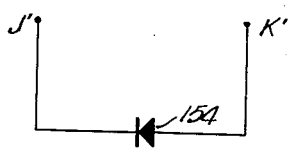

FIG. 15 is similar to FIG. 12 except that there is a three pole switch 152 in series with the primary windings of the three phase signal inductor (150), each pole of the switch being bridged by a reactor 151 in a manner similar to that employed in FIG. 14. The primary in FIG. 15, however, is connected in ungrounded Y which provides a high voltage across terminals J and K when switch 152 is closed during the signaling interval. In addition to the six choices of separate excitation (FIGS. 6–11) there is one additional choice for this diagram, that is, FIG. 16. At the high levels of flux density, 23 kilogauss and perhaps above, a sufficient third harmonic voltage will appear across J, K such that the rectifier 154 in FIG. 16 will produce a sufficient current in the secondary that the signal inductor can be considered as self-excited. The self-excited signal inductor has as its principal advantage extreme simplicity and high operating efficiency. The drawbacks are the high peak inverse rating of the rectifier 154 and the possibility that the voltage applied at 100a, 100b and 100c may change 5 to 10 percent during normal operations. A 10 percent rise in voltage on a self-excited unit would produce a very high primary current, and high current may prove to be damaging to the reactor from a thermal basis.

Figure 17:
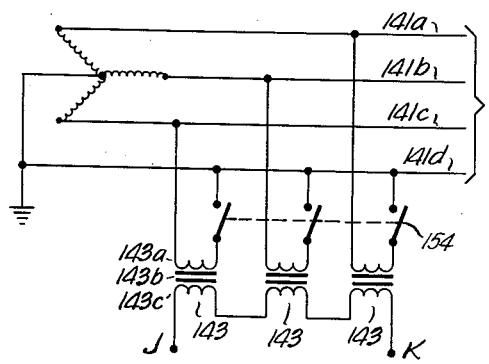

FIG. 17 is almost identical to FIG. 13 except that primary switches 154 have been installed at the neutral side of the grounded Y primary windings 143a. The supply system is four wire three phase 141a, 141b, 141c and 141d. Any of the six excitation schemes described before (FIGS. 6–11) will provide suitable operation at high efficiency because of the high flux levels obtainable when primary switching is used.

Although in the interest of simplicity and clarity no means have been shown in FIGS. 1–17 for protecting the various rectifiers against damage due to transients or faults on the power line, it is good practice in all cases to bridge the rectifier with certain protective equipment rather than to increase the voltage rating of the rectifier.

Figure 18:
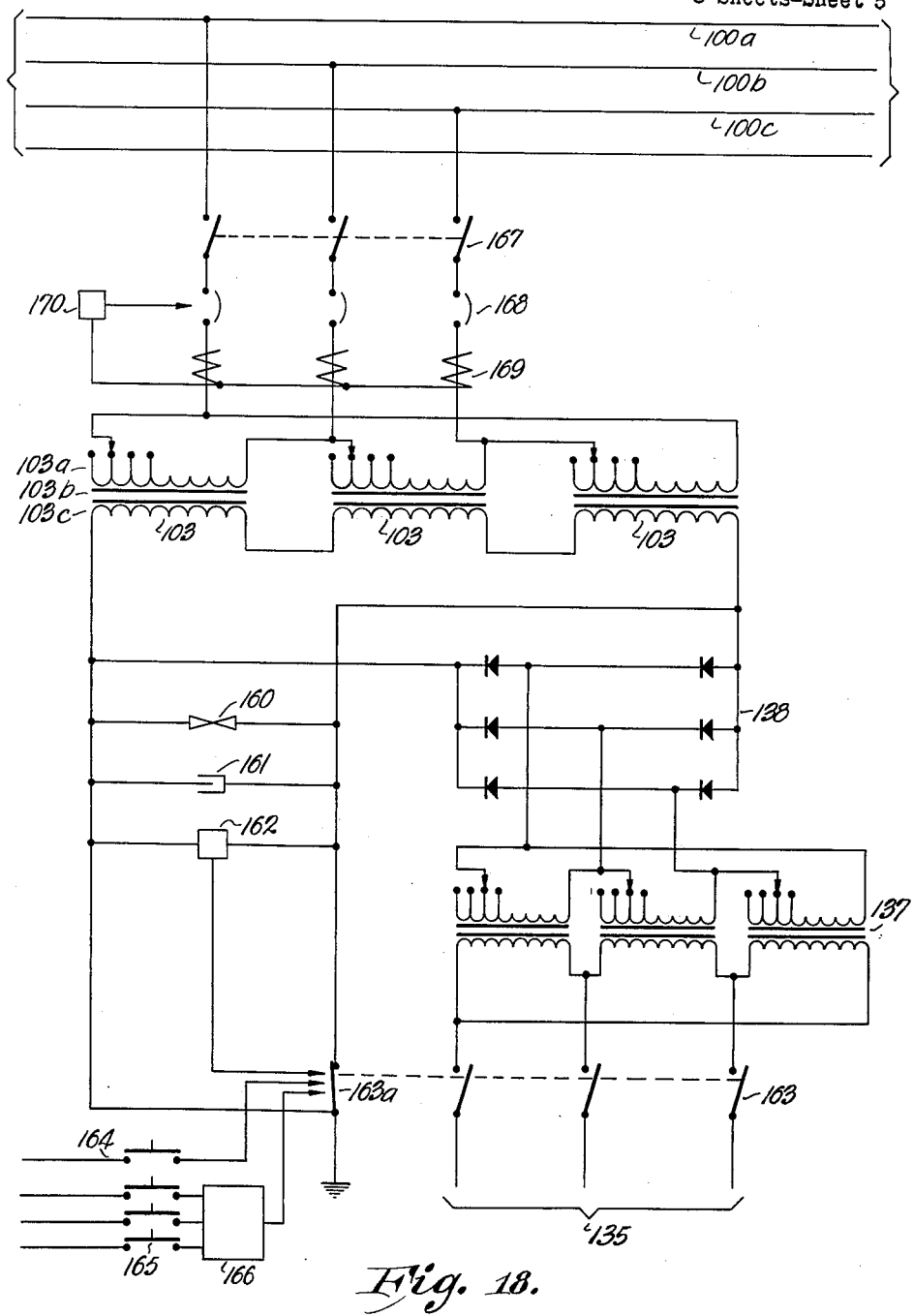
FIG. 18 is a circuit diagram illustrating one particular version of my harmonic signal inductor that has been installed and field tested in the network illustrated in FIG 1.

In order that a clearer understanding of this may be had, suitable protective facilities are shown to FIG. 18 which is a simplified schematic diagram of a relatively large signal inductor 43 (FIG. 1) actually installed on a 44 kv. bus in a city of 100,000 population and exhaustively tested to verify its ability to reach all parts of the city with a 240 cycle signal of sufficient strength to be adequate for mass warning purposes. As previously mentioned, this installation employed, as the harmonic signaling inductor, three transformers 103 rated at 5000 kva. on an intermittent basis. The primary windings 103a were connected in delta to the bus (100a, 100b and 100c) and the secondary windings 103c were connected in broken delta conforming precisely with the arrangement shown in FIG. 6; direct current excitation was supplied to the broken delta by the arrangement shown in FIG. 10. The basic mode of operation of this installation will of course be clear from the earlier description of FIGS. 6 and 10, so it will be sufficient for present purposes merely to explain the protective equipment which was employed.

Signaling is, of course, controlled by the three-pole switch 163 which, during the signaling interval, causes current from the three-phase A.C. supply 135 to be fed via voltage matching transformers 137 to the rectifier 138 which in turn then supplies rectifier current to the ends of the broken delta secondary windings 103c. In this case, however, the signal-controlling switch 163 is provided with an extra contact 163a for protective purposes. The latter contact is closed, as shown, during stand-by or non-signaling condition, but opens during the signaling interval; when closed it completes an obvious short circuit across the ends of the broken delta secondary windings 103c, and thus protects rectifier 138 from any possible transients which might occur during standby. Inasmuch as signaling will average, at the most, only a few seconds a day the rectifier is protected almost all of the time by contact 163a.

To guard against a high voltage appearing across the rectifier during those brief intervals when contact 163a is open, a silicon carbide varistor 160 has been included in bridging relation thereto. The varistor has an exponential relationship of current versus the voltage which is applied across it. It acts as a voltage limiter but since the mechanism of this nonlinear voltage-current relationship is thermal it requires up to a millisecond to respond. To absorb high frequency transients which the varistor would not limit, a capacitor 161 is also connected across the line in parallel with the varistor.

Finally, an over voltage relay 162 connected across the broken delta secondary windings 103c is adjusted so that it will pick up at just below the peak inverse voltage rating of the rectifier 138. This relay will isolate the rectifier when a sustained over voltage occurs and in operation has protected the rectifier from several conditions which might have caused failure. Responsive to an over voltage, relay 162 trips the contactor 163 removing the A.C. applied voltage 135 from the rectifier 138 and at the same time it closes contact 163a, thereby shorting the delta 103c. It may be noted that the contactor can be operated either by the manual switch 164 or by selection of one of the three code push buttons 165 to the code programmer 166. The code programmer 166 will open and close contactor 163 in the proper coded sequence for operation of code receivers.

The primary disconnect switches 167 are present because of standard power company operating policies. Normally closed except when it is desired to service or inspect some component of the harmonic signal inductor installation, they permit disconnecting and isolating the circuit so that the circuit breaker 168 can be serviced and so that a visual check can be made to assure that there will be no hazard while servicing the inductor. The circuit breaker also is present to assure removal of the inductor from the circuit if there should be an accidental fault on the iductor or if the magnetizing inrush upon closing the breaker should be so great as to threaten tripping of some other breaker which would disconnect a load. Tripping of the breaker 168 is controlled by three current transformers 169 and the overcurrent relay 170 which serve the function of detecting overcurrents that might otherwise damage the inductor or cause improper system operation.

In a practical field installation of an inductor it is not desirable to change the D.C. excitation current frequently; however, it is desirable to be able to select the optimum value of excitation for the service of the inductor. Therefore, the excitation supply transformer 137 has a series of secondary taps to permit excitation current adjustment.

Although the requirements and auxiliary equipment detailed in FIG. 18 have been omitted from FIGS. 2–17, inclusive, in the interest of simplicity and clarity it should be understood that their use is contemplated and is within the spirit of my invention.

From the foregoing it will be seen that this invention is one well adapted to attain all of the ends and objects hereinabove set forth together with other advantages which are obvious and which are inherent to the structure.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In an electric power distribution network of the public utility type wherein the power is supplied by a plurality of alternating current generators which are network interconnected for synchronous parallel operation; the improvement which comprises a plurality of geographically separated signaling stations connected to different power supply lines in said network, a signal receiving station connected to still another power line in said network, said network including at least one connection between said last line and each of said first lines thereby to provide multiple signaling paths between said signaling stations and said signal receiving station, each signaling station having a signaling condition and a nonsignaling condition, means at each signaling station operative under one of said conditions to connect an asymmetric inductance in shunt to its line, and said signal receiving station being selectively responsive to a predetermined signal frequency band comprising an even harmonic of the fundamental frequency at which power is supplied to said network by said generators.

2. In an electric power distribution network of the public utility type wherein the power is supplied by a plurality of alternating current generators which are network interconnected for synchronous parallel operation; the improvement which comprises a plurality of geographically separated signaling stations connected to different power supply lines in said network, a signal receiving station connected to still another power line in said network, said network including at least one connection between said last line and each of said first lines thereby to provide multiple signaling paths between said signaling stations and said signal receiving station, each signaling station having a signaling condition and a nonsignaling condition, means at each signaling station operative under one of said conditions to connect an asymmetric inductance in shunt to its line, and said signal receiving station being selectively responsive to a predetermined signal frequency band comprising the fourth harmonic of the fundamental frequency at which power is supplied to said network by said generators.

3. In an alternating current power supply system, a power transmission line having a load connected thereto, a source of alternating current power also connected to said line at a point removed from said load for supplying power to the load via said line, said line having a signal transmitting station associated with said line at a particular point thereon, means at said station for inducing in said line a signal comprising at least the second harmonic of the power voltage wave at said particular point, said last means comprising an inductive reactor having a core of magnetic material, a winding on said core connected in shunt to said line at said particular point and effective to apply to the core an alternating magnetomotive force whose instantaneous peak value exceeds the value required to drive said core into saturation, and means for applying to said core, during the application of said alternating magnetomotive force thereto, a unidirectional magnetomotive force to produce asymmetry of flux in said core.

4. In an alternating current power supply system, a power transmission line having a load connected thereto, a source of alternating current power also connected to said line at a point removed from said load for supplying power to the load via said line, said line having a signal transmitting station associated with said line at a particular point thereon, means at said station for inducing in said line a signal comprising at least the fourth harmonic of the power voltage wave at said particular point, said last means comprising an inductive reactor having a core of magnetic material, a winding on said core connected in shunt to said line at said particular point and effective to apply to the core an alternating magnetomotive force whose instantaneous peak value exceeds the value required to drive said core into saturation, and means for applying to said core, during the application of said alternating magnetomotive force thereto, a unidirectional magnetomotive force to produce asymmetry of flux in said core.

5. In an alternating current power supply system, a power transmission line having a load connected thereto, a source of alternating current power also connected to said line at a point removed from said load for supplying power to the load via said line, said line having a signal transmitting station associated therewith at a particular point on the line, means at said station for inducing in said line a signal comprising at least one harmonic of the power voltage wave at said particular point, said last means comprising an inductive reactor having a core of magnetic material, a winding on said core connected in shunt to said line at said particular point whereby it is effective to apply an alternating magnetomotive force to the core, and said core having a B/H curve which is asymmetrical with respect to said alternating magnetomotive force.

6. In an alternating current power supply system, a power transmission line having a load connected thereto, a source of alternating current power also connected to said line at a point removed from said load for supplying power to the load via said line, said line having a signal transmitting station associated therewith at a particular point on the line, means at said station for inducing in said line a signal comprising a plurality of harmonics of the power voltage wave at said particular point, said last means comprising an inductive reactor having a core of magnetic material, a winding on said core connected in shunt to said line at said particular point whereby it is effective to apply an alternating magnetomotive force to the core, and said core having a B/H curve which is asymmetrical with respect to said alternating magnetomotive force.

7. In an alternating current power supply system, a power transmission line having a load connected thereto, a source of alternating current power also connected to said line at a point removed from said load for supplying power to the load via said line, said line having a signal transmitting station associated therewith at a particular point on the line, an inductive reactor at said station having a core of magnetic material, a winding on said core connected in shunt to said line and effective to apply to the core an alternating magnetomotive force whose R.M.S. value is sufficient to produce a flux level of at least 17 kilogauss in the core, and means for applying to said core during the application of said alternating magnetomotive force thereto a unidirectional magnetomotive force to produce asymmetry of flux in said core.

8. In an alternating current power supply system, a power transmission line having a load connected thereto, a source of alternating current power also connected to said line at a point removed from said load for supplying power to the load via said line, said line having a signal transmitting station associated therewith at a particular point on the line, means at said station for inducing in said line a signal comprising at least the second harmonic of the power voltage wave at said particular point, said last means comprising an asymmetric inductance connected in bridge to said line at said particular point.

9. In an alternating current power supply system, a power transmission line having a load connected thereto, a source of alternating current power also connected to said line at a point removed from said load for supplying power to the load via said line, said line having a signal transmitting station associated therewith at a particular point on the line, means at said station for inducing in said line a signal comprising at least the fourth harmonic of the power voltage wave at said particular point, said last means comprising an asymmetric inductance connected in bridge to said line at said particular point.

10. In an alternating current power supply system, a power transmission line having a load connected thereto, a source of alternating current power also connected to said line at a point removed from said load for supplying power to the load via said line, said line having a signal transmitting station associated therewith at a particular point on the line, means at said station for inducing in said line a signal comprising at least the second and fourth harmonics of the power voltage wave at said particular point, said last means comprising an asymmetric inductance connected in shunt to said line.

11. In an alternating current supply system, a power transmission line having, at a particular point along its length, a signaling station through which alternating current power passes en route from an upstream source to a downstream load, said station having a signaling condition and a nonsignaling condition, means at said station operative under one of said conditions to impose an asymmetric inductance on said line, said inductance comprising a core of magnetic material having a pair of windings thereon, one of said windings being connected in shunt to said line during said one condition, and means for causing a unidirectional current to flow in the other winding.

12. A system as in claim 11 wherein said last means comprises a source of rectified alternating current.

13. A system as in claim 11 wherein said last means comprises a rectifier connected in shunt to said other winding.

14. In an alternating current power supply system, a power transmission line having, at a particular point along its length, a signaling station through which alternating current power passes en route from an upstream source to a downstream load, means at said station for inducing in said line a signal comprising at least one predetermined harmonic of the voltage wave at said point, said means comprising an inductive reactor having a core of magnetic material, a pair of windings on said core, one of said windings being connected in shunt to said line and the other winding being bridged by a circuit including a rectifier, and means for increasing the effective inductance of said one winding to a sufficiently high value to terminate production of said harmonic signal in said line.

15. In an alternating current power supply system, a three-phase power transmission line having, at a particular point along its length, a signaling station through which alternating current power passes en route from an upstream source to a downstream load, means at said station for inducing in said line at least one predetermined harmonic of the power supply voltage, said means comprising a plurality of inductive reactors each having a primary winding and a secondary winding, said primary winding being delta-connected to said line, the secondary windings of said reactors being connected in broken delta, and a source of unidirectional current bridging the ends of said broken delta.

16. A system as in claim 15 wherein said source comprises a rectifier and a source of A.C. potential connected to the ends of said broken delta via said rectifier.

17. In an alternating current power supply system, a three phase power transmission line having, at a particular point along its length, a signaling station through which alternating current power passes en route from an upstream source to a downstream load, means at said station for inducing in said line at least one predetermined harmonic of the power supply voltage, said means comprising a plurality of inductive reactors each having a primary winding and a secondary winding, said primary windings being Y-connected to said line, the secondary windings of said rectifiers being connected in broken delta, and a source of unidirectional current bridging the ends of said broken delta.

18. A system as in claim 17 wherein said source comprises a rectifier.

19. A system as in claim 17 wherein said source comprises an alternating current supply, a rectifier having an alternating current input connected to said supply, and said rectifier having a direct current output connected to the ends of said broken delta.

20. In an electric power distribution network of the public utility type wherein the power is supplied by a plurality of three-phase alternating current generators which are network-interconnected for synchronous parallel operation; the improvement which comprises a plurality of geographically separated signaling stations connected to different power supply lines in said network whereby said stations also are network-interconnected, each station having a signaling condition and a nonsignaling condition, means at each signaling station operative under said signaling condition to induce in its power supply line a predetermined signal frequency band comprising at least one harmonic of the fundamental frequency at which power is supplied to said network by said generators, said means comprising a three-phase transformer at each station having its primary connected to that station's power line during signaling condition, the secondary of each transformer being a broken delta with a source of unidirectional current bridging the ends of said broken delta during signaling condition, a signal receiving station, said network including at least one connection between said receiving station and each of said first power lines thereby to provide multiple signaling paths between said signaling stations and said receiving station, and said receiving station being selectively responsive to a predetermined signal frequency band comprising said harmonic of the fundamental frequency at which power is supplied to said network by said generators.

No references cited.